United States Patent [19]

Sheller

[11] Patent Number: 5,422,083
[45] Date of Patent: Jun. 6, 1995

[54] REINFORCED CONVERTER BODY

[75] Inventor: David T. Sheller, Garrettsville, Ohio

[73] Assignee: W. R. Grace & Co.-Conn., New York, N.Y.

[21] Appl. No.: 84,426

[22] Filed: Jun. 29, 1993

[51] Int. Cl.6 ............................................. F01N 3/28
[52] U.S. Cl. ................... 422/174; 422/177; 422/180; 60/300; 60/299; 502/439
[58] Field of Search ............... 422/174, 177, 180; 60/284, 300, 299; 502/315 ∝ 316, 336, 439

[56] References Cited

U.S. PATENT DOCUMENTS

| | | | |
|---|---|---|---|
| 4,414,023 | 11/1983 | Aggen et al. | 75/124 |
| 4,711,009 | 12/1987 | Cornelison et al. | 422/180 |
| 4,976,929 | 12/1990 | Cornelison et al. | 422/174 |
| 5,070,694 | 12/1991 | Whittenberger | 422/180 |
| 5,102,743 | 4/1992 | Maus et al. | 428/593 |
| 5,174,968 | 12/1992 | Whittenberger | 422/174 |
| 5,232,671 | 8/1993 | Brunson et al. | 422/174 |

Primary Examiner—Robert J. Warden
Assistant Examiner—Hien Tran
Attorney, Agent, or Firm—Beverly K. Johnson

[57] ABSTRACT

There is provided a reinforced converter body, especially one useful as a "light-off" converter in a gas treating system for treating exhaust gas from internal combustion engines. The invention utilizes corrugated and flat thin metal strips in alternating relation. Reinforcement is enhanced by the use of thin metal strips of a stronger alloy for at least a part of the thin metal strips.

24 Claims, 2 Drawing Sheets

REINFORCED CONVERTER BODY

This invention relates to a converter body useful for altering the chemical composition of a fluid, particularly a gas. More particularly, the invention in its specific applications, relates to a converter for altering the chemical composition of exhaust gas from an engine, e.g., an internal combustion engine, to remove pollutant material therefrom prior to its entry into the atmosphere.

The invention is especially concerned with a metal monolith converter useful in a combined electrically heatable catalytic converter and a "light-off" converter. The metal monoliths hereof may be used alone in the exhaust lines of small engines, e.g., motor cycles, lawn mowers, boat engines, etc. Exhaust gas, for example, passes through an electrically heated converter unit to elevate its temperature to the point where, in the presence of a catalysts, pollutant material contained therein is converted to harmless gas prior to passage into the atmosphere.

The converter bodies of the present invention are particularly useful as a component of a catalytic converter system for automotive vehicles which treats pollutant-laden exhaust gases in such a way as to reduce exhaust pollutants to an acceptable level. While the following discussion will be limited to catalytic converters for vehicles, it will be understood that the principles hereof apply to stationary as well as mobile devices, and to chemical reactors other than converters for exhaust gas pollutants.

BACKGROUND OF THE INVENTION AND PRIOR ART

The purpose of a catalytic converter for an internal combustion engine, or a gas turbine, is to convert pollutant materials in the exhaust, e.g., carbon monoxide, unburned hydrocarbons, nitrogen oxides, etc., to carbon dioxide, nitrogen and water prior to discharge into the atmosphere. Conversion to such relatively harmless by-products is not efficient initially when the exhaust gases are relatively cold, e.g., at cold engine start. To be effective at a high conversion rate, the catalyst and surface of the converter which the gases contact must be at or above a minimum temperature, e.g., 390° F. for carbon monoxide, 570° F. for volatile organic compounds, and about 900° F. for methane or natural gas. Otherwise, conversion to harmless by-products is poor and cold start pollution is high.

To achieve initial heating of the catalyst at engine start-up, there is conveniently provided an electrically heatable catalytic converter unit, preferably one formed of a thin metal honeycomb monolith. Recent developments have demonstrated the advantage of providing a "cascade" of converters, i.e., a low thermal inertia electrically heatable converter (EHC), followed by a medium thermal inertia converter, or light-off converter followed by a large thermal inertia main converter, all in the same conduit or gas flow line. Heat generated from an oxidation reaction initiated in the EHC then heats the intermediate converter which in turn heats the large converter. The EHC preheats the exhaust gas to its "light-off" temperature for entry into the "light-off" converter where in the presence of catalyst pollutant material is converted. Some conversion occurs in the EHC, and most of the conversion occurs in the final catalytic converter section which is not normally electrically heated. The present invention is primarily concerned with the "light-off" converter which follows an electrically heatable converter section.

A common problem with thin metal honeycomb monoliths has been their inability to survive severe automotive industry durability tests which are known as the Hot Shake Test and the Hot Cycling Test.

The Hot Shake Test involves oscillating (100 to 200 Hertz and 28 to 60 G inertial loading) the test device in a vertical attitude at high temperature (between 800° and 950° C.; 1472° to 1742° F. respectively) with exhaust gas from a running internal combustion engine simultaneously passing through the device. If the test device telescopes or displays separation or folding over of the leading or upstream edges of the thin metal foil leaves up to a predetermined time, e.g., 5 to 200 hours, the test device is said to fail the test. Usually a device that lasts 5 hours will last 200 hours. Five hours is equivalent to 1.8 million cycles at 100 Hertz.

The Hot Cycling Test is conducted with exhaust gas flowing at 800° to 950° C. (1472° to 1742° F.) and cycles to 120° to 150° C. once every 15 to 20 minutes for 300 hours. Telescoping or separation of the leading edges of the thin metal foil strips is considered a failure.

The Hot Shake Test and the Hot Cycling Test are hereinafter called "Hot Tests," and have proved very difficult to survive. Many efforts to provide a successful device have been either too costly or ineffective for a variety of reasons.

The reinforced structures of the present invention will survive these Hot Tests.

Reference may be had to U.S. Pat. No. 5,102,743 dated Apr. 7, 1992 to Maus et al. This patent discloses a monolith made of thin metal strips, alternating corrugated and flat sheet metal layers. The reference discloses that at least one of the sheet metal layers has a greater thickness over at least part of at least one of the dimensions (length and width) than the others of the layers. The at least one sheet metal layer having a greater thickness is formed of thicker sheet metal than others of the layers or it is formed of a plurality of identically structured metal sheets resting closely against one another. The present invention depends upon the use of sheet metal layers of different alloys having different strengths than others of the sheet metal layers to achieve a durable converter body.

In the following description, reference will be made to "ferritic" stainless steel. A suitable ferritic stainless steel alloy is described in U.S. Pat. No. 4,414,023 dated Nov. 8, 1983 to Aggen. A specific ferritic stainless steel useful herein contains 20% chromium, 5% aluminum, and from 0.002% to 0.05% of at least one rare earth metal selected from cerium, lanthanum, neodymium, yttrium, and praseodymium, or a mixture or two or more of such metals, balance iron and trace steel making impurities. This alloy has a yield strength at 900° C. of 2,000 psi, an ultimate tensile strength of 5,300 psi, and 1% creep strength at 1000 hours of 330 psi. Another metal alloy especially useful herein is identified as Haynes 214 alloy which is commercially available. This alloy and other nickeliferous alloys are described in U.S. Pat. No. 4,691,931 dated Jun. 9, 1987 to Herchenroeder et al. A specific example contains 75% nickel, 16% chromium, 4.5% aluminum, 3% iron, optionally trace amounts of one or more rare earth metals, except yttrium, 0.05% carbon, and trace amounts of steel making impurities. This alloy has a yield strength of 46,000 psi, an ultimate tensile strength of 52,000 psi and a 1% creep strength at 1000 hours of 2500 psi, all properties measured at 900° C. Haynes 230 Alloy, also useful herein, has a composition containing 22% chromium, 14% tungsten, 2% molybdenum, 0.10% carbon, 5% max cobalt, 3% max iron, and a trace amount of lanthanum, and balance nickel. Haynes 230 alloy has a yield strength of 32,100 psi, an ultimate tensile strength of 49,000 psi and a 1% creep strength at 1000 hours of 3700 psi, all properties measured at 900° C. Ferritic stainless steel (commercially available from Allegheny Ludlum Steel Co. under the Trademark "Alfa IV") and the Haynes alloys are examples of high temperature resistive, oxidation resistant (or corrosion resistant) metals that are suitable for use in the converters hereof. Suitable metals must be able to withstand temperatures of 900° C. to 1100° C. over prolonged periods.

It has now been found that a multicellular converter body formed of alternating corrugated and flat thin metal layers and having some of the thin metal strips replaced with a different and stronger alloy will survive the Hot Tests.

BRIEF STATEMENT OF THE INVENTION

Briefly stated, the present invention is a multicellular converter core formed from an S-wound stack of alternating corrugated and flat thin metal strips, said core having a first portion of the thin metal strips of a first alloy, and a second portion of the thin metal strips of a second alloy, said second alloy having a yield strength at a given temperature and for a given thickness greater than that of the first alloy. In more specific embodiments, the invention contemplates a housing or "mantle" containing a core or "matrix" comprising an S-wound series of alternating corrugated and flat thin metal strips wherein the corrugated thin metal strips have a flat or flattened central portion, gathered together in laminar relation at the central portions and secured together, the free ends of the thin metal strips being secured to the inner surface of the housing, said core having a first portion of the thin metal strips of a first alloy and a second portion of the thin metal strips of a second alloy, said second alloy having a greater yield strength at a given temperature than said first alloy.

BRIEF DESCRIPTION OF THE DRAWINGS

The invention will be better understood by having reference to the annexed drawings showing a preferred embodiment of the invention and wherein.

DETAILED DESCRIPTION OF THE INVENTION

As indicated above, the present invention is a converter body, particularly a "light-off" converter core body which has been reinforced in such a way as to enable it to survive the Hot Tests. Reinforcement is achieved principally by using in the matrix a few spaced thin metal strips, whether corrugated or flat, or selected ones of each, of a different alloy from that which is used for the larger balance of the thin metal strips. In the preferred embodiments, the two differently structured alloy strips have the same thickness. Further reinforcement is obtained by securing the central portions of the strips together, for example, by means of a fused metal, e.g., a high melting brazing metal, or by welding prior to S-winding the strips. Still further reinforcement is obtained by securing the distal extremities of the thin metal strips to a surrounding metal housing, as by means of a fused metal. It is especially advantageous to secure the thin metal strips in the central portions and also at the distal extremities to the mantle or housing, leaving the intermediate portion free to expand and contract as it will in use. This structure provides for slippage between the thin metal strips during heating and cooling and reduces wear. If the thin metal strips are secured in the intermediate portion as by brazing, for example, expansion and contraction due to cycling temperature will cause reciprocating bending and ultimate failure of the matrix.

Further reinforcement may be obtained by folding over the leading edges, and preferably the trailing edges, to provide a "hem" along such edges of from about ¼" to about ¾". In the case of the corrugated thin metal strips, the "hem" is provided before corrugation takes place. Alternatively, the thickness of the thin metal strips may be increased, say from 0.0016" to 0.0030", or the thickness of only the flat thin metal strips so increased, or the thickness of only the corrugated thin metal strips so increased.

In a specific embodiment, all of the corrugated thin metal strips may be made of 0.002" ferritic stainless steel, e.g., Alfa IV as described above, as well as the major number of the flat thin metal strips. From 1 to 24 or more of the flat thin metal strips may be made of Haynes 214 alloy, or Haynes 230 alloy. Desirably, from 2-6 flat thin metal strips are disposed at spaced locations in the bundle of thin metal strips, preferably at uniformly spaced locations. The term "thin" as applied to the "thin" metal strips is used herein and in the appended claims to mean a metal strip having a thickness broadly in the range of from about 0.001" to about 0.009". The converter bodies hereof may have a cell density of from about 50 cells per square inch (cpsi) to about 800 cpsi, and desirably from about 100 cpsi to about 400 cpsi.

Figure 1:
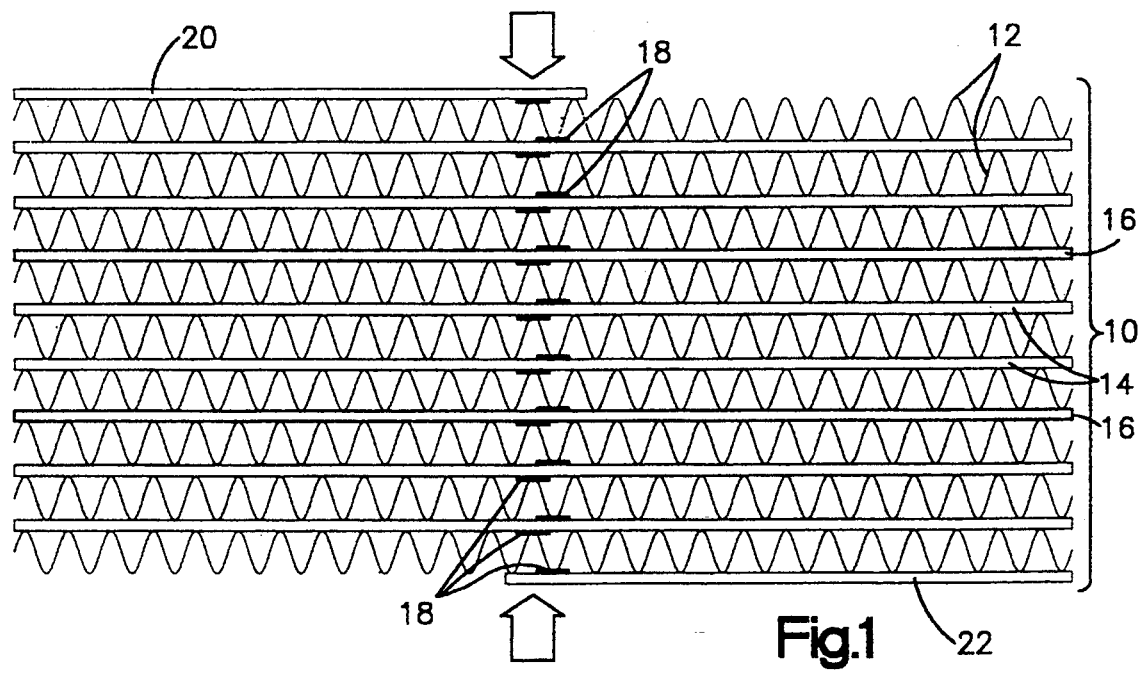
FIG. 1 shows a series of alternating corrugated and flat thin metal strips with thin layers of brazing paste in place for securing the thin metal strips together in the central portion.

Referring now more particularly to the drawings, FIG. 1 shows a bundle 10 of thin metal strips alternating corrugated strips 12 and flat strips 14. These thin metal strips range in length from about 5" to about 12" and have a width of from about 1.5" to about 5". Every third flat thin metal strip 16 is formed of a stronger alloy, e.g., a chrome/nickel alloy such as Haynes 214 or Haynes 230, as above described. These strips 16 are indicated in the drawings by heavier black lines. This is not to indicate a thin metal section thicker than the other thin metal strips. These different alloy thin metal sheets 16 preferably have the same thickness as the corrugated thin metal strips 12 and the remaining flat thin metal strips 14.

Disposed between each of the sheets 12, 14 and 16 and its contiguous neighbor is a narrow layer 18 of brazing paste. Such brazing paste is commercially available from Wall Colmonoy Corp. in Madison Heights, Mich. 48071. These brazing alloy pastes are nickel, chromium, silicon, carbon and boron containing, and fuse at a temperature in the range of 2100° F. to 2200° F. The region where the brazing paste is applied should be stripped of any coating, e.g., a refractory metal oxide coating applied during the corrugation process as described, for example, in U.S. Pat. No. 4,711,009 to Cornelison et al dated Dec. 8, 1987.

The bundle 10 is completed with partial flat sheets 20 and 22 at the top and bottom of the bundle 10, respectively. These are for the purpose of preventing nesting of the otherwise nestable corrugated first and last strips in the bundle 10 when the bundle is S-wound.

Figure 2:
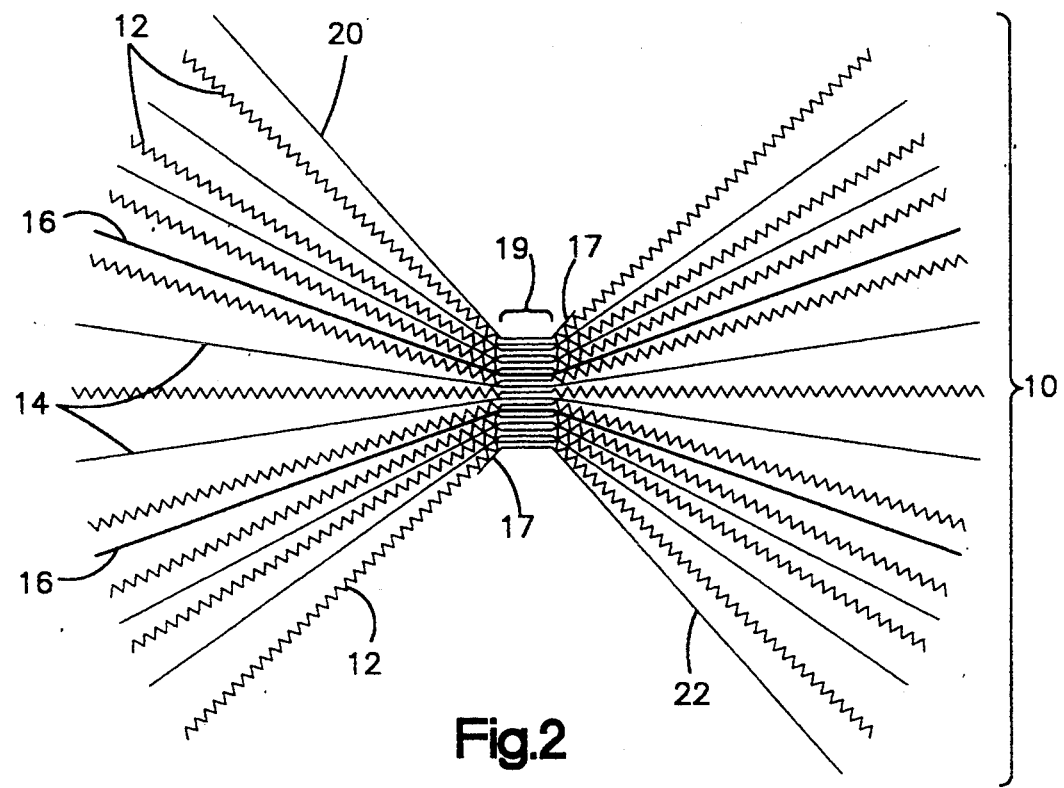
FIG. 2 shows the series of alternating corrugated and flat thin metal strips of FIG. 1 which has been crushed in the central portion to flatten the corrugations and prior to S-winding the bundle of thin metal strips, and fusion of the brazing metal paste.

FIG. 2 shows the bundle 10 of FIG. 1 after the central portion 19 has been crushed to flatten the corrugations of the strips 12 in that region 19. Heat is later applied by any suitable means to fuse the brazing metal paste 18 and to secure the thin metals strips 12, 14 and 16 together. Alternatively, spot welding, or mechanical means, such as a rivet, or a strap or encircling band, or a clamp may be used. Any coating applied to the surface or surfaces of the thin metal strips in the area to be brazed or welded should be removed by wire brushing, or any other suitable means, prior to the fusion operation.

The top and bottom flat strips 20 and 22 have an extension 17 which extends beyond the central portion or region 19. In winding the matrix, the central portion 19 is grasped with an arbor and rotated, say in a clockwise direction, and the extensions 17 cover the corrugations in the adjacent contiguous thin metal sheet 12 in the resulting eye 23 (FIG. 3).

These devices have a cell density in the range of from about 50 to about 800 cells per square inch (cpsi), preferably in the range of from 100 to 400 cpsi. The corrugations have an amplitude in the range of from 0.0032" to 0.2", and a pitch of from 0.0088" to 0.405". The corrugations are desirably triangular with the apices being rounded to relieve stress, or they may be sinusoidal, or they may be rectangular in cross-sectional profile. The thickness of the "thin" metal strips, whether flat or corrugated is desirably in the range of from 0.0016" to 0.005", with 0.002" being preferred. A "hem" of 0.5" is conveniently provided along the leading or upstream·edge and desirably, albeit not essentially, along the trailing edge or downstream edge of the thin metal strips.

Figure 3:
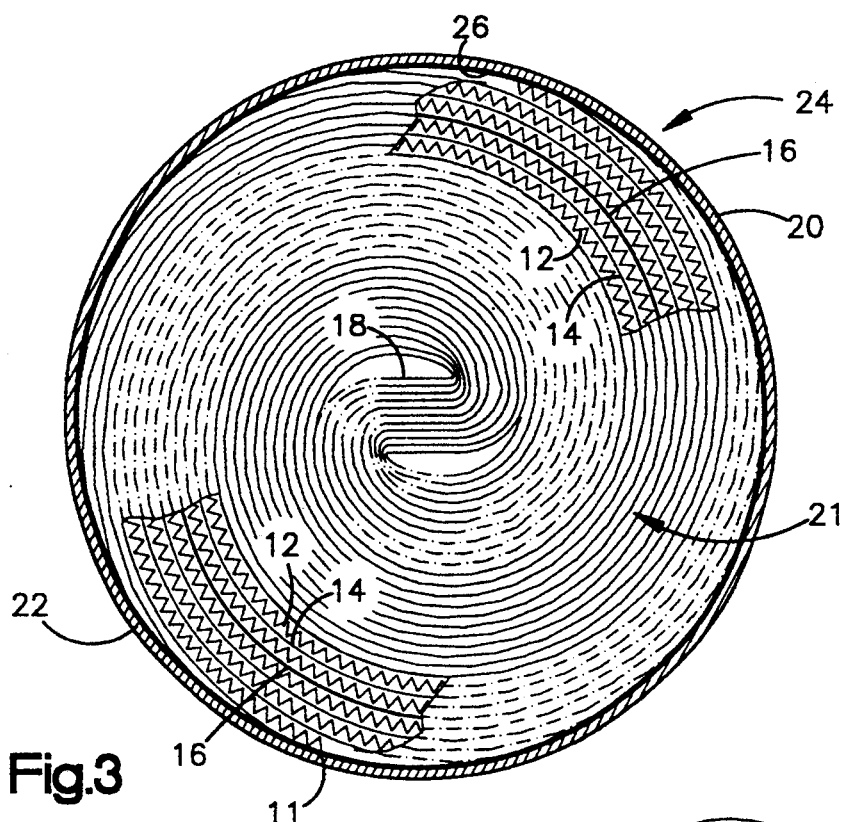
FIG. 3 shows an end view of a metal monolith converter of the present invention showing in darker lines, the different alloy metals which reinforce the core.

FIG. 3 is an end view of an S-wound converter body 24 of the present invention. There is here provided a retaining housing 20 or mantle 20 for the matrix or core 21 and to the inner surface of which housing 20 the distal extremities of the thin metal strips 12, 14 and 16 are secured as by brazing or any other suitable means. The central portion 19 is shown and provides a rigid central support member 19 for the thin metal strips 12, 14 and 16. The central rigid support member 19 is grasped by a suitable arbor or clamp and rotated in a clockwise manner to S-wind the core. A sheet of thin brazing metal 11 is then wrapped around the outside of the wound bundle to enable securing of the distal extremities of the thin metal sheets 12, 14, and 16 to the inner surface 26 of the housing 20. Heat may be supplied by heating to 2100° F. to 2200° F. in a hydrogen atmosphere. Thus, the thin metal strips 12, 14 and 16 forming the core 21 are secured for their entire axial length in the central portion 19 and at the outer or distal extremities to the retaining housing or mantle 20. The intermediate portions of the thin metal strips are desirably not attached together by a fused metal so as to allow for reciprocating relative movement of the thin metal strips in response to temperature changes. Fusion of the brazing paste and the thin brazing foil can conveniently be carried out simultaneously. Further reinforcement is provided by the thin metal strips 16 of a different, stronger alloy.

Figure 4:
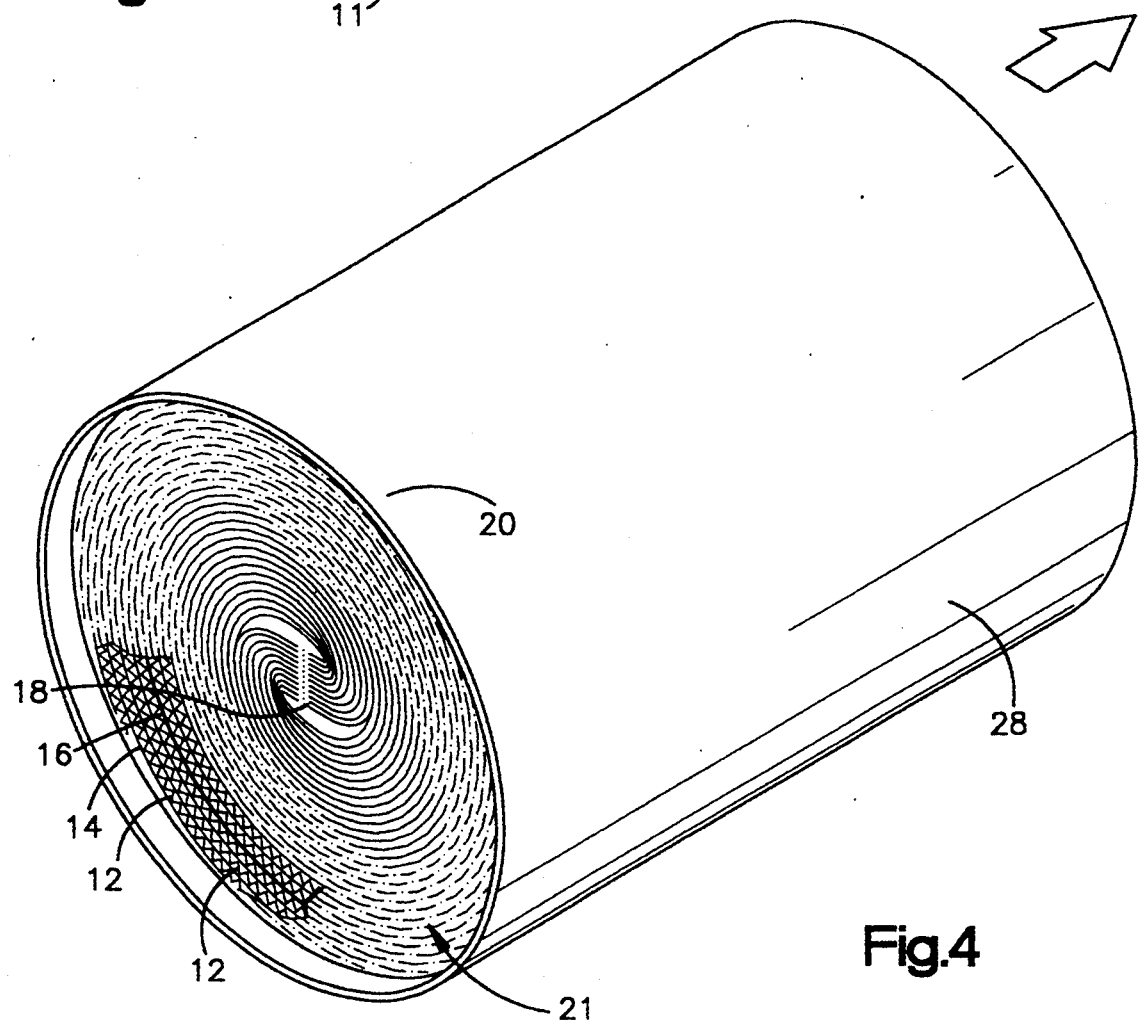
FIG. 4 is a perspective view of a metal monolith converter of the present invention.

FIG. 4 is a perspective view of a converter body 28 and showing the S-wound bundle of thin metal strips 12, 14, and 16 in the housing 20, and the central rigid member 19 formed by the securing together of the central portions of the thin metal strips as described above. The metal monolith converter body 28 is not electrically heated, although it may be, if desired. Usually, these metal monolith, or "light-off" bodies are used in conjunction with an electrically heatable "pancake" converter placed upstream of the "light-off" converter body and held in the same outer housing (not shown in the annexed drawings). In certain application, the "light-off" converter body may be placed near the manifold and the electrically heatable converter farther downstream. Any series arrangement of the electrically heatable converter, the "light-off" converter, and the conventional converter may be used. Reference may be made to commonly owned U.S. patent application Ser. No. 08/066,887 filed May 25, 1993 by Wm. A. Whittenberger for details of a combined EHC and "light-off" converter in the same outer housing.

Reference has been made above to U.S. Pat. No. 4,711,009 which patent is incorporated herein by reference. The portion of the process relating to heat treating and corrugating a thin metal strip, coating one or both surfaces with a refractory metal oxide coating, and applying a noble metal catalyst is particularly applicable hereto.

The thin metal strips 12, 14 and 16 are desirably coated with a refractory metal oxide, e.g., alumina, titania, alumina/ceria, titania/ceria, silica, zirconia, titania/alumina, etc. in the process of the aforementioned U.S. Pat. No. 4,711,009. Thus, coating is preferably done prior to formation of the thin metal strips into a matrix and placement in a mantle. Likewise, it is preferable to apply the catalyst metal at the time the refractory metal oxide coating is applied, either simultaneously or sequentially. So far as the catalyst is concerned, this may be after applied when the metal monolith is fully formed by a dipping and calcining operation. Suitable catalyst metals are well known and include the noble metals, e.g., platinum, palladium, rhodium and ruthenium, and mixtures of two or more such metals. The refractory metal oxide coating forms a particularly suitable substrate for the catalyst metal.

The reinforced device of the present invention will withstand the severe automotive industry durability tests briefly described above. Because it has been found unnecessary to braze or weld the corrugated thin metal sheets to the flat thin metal sheets throughout their continuity, considerable expense is spared. Also fatigue failure due to repeated expansion and contraction in the case of fully brazed matrices where the entire contiguity of the flat and corrugated thin metal sheets is brazed, is avoided. Also, the present structure avoids the need for a separate central pin and a bar on the downstream face of the core to prevent telescoping.

WHAT IS CLAIMED IS:
1. A multicellular converter core comprising an S-wound stack of alternating corrugated and flat thin stainless steel metal strips, said stack having a central portion, and said strips having a central portion and distal extremities, said core having a first portion of the thin stainless steel metal strips of a first alloy, and a second portion of the thin stainless steel metal strips of a second alloy, said second alloy having a yield strength greater than that of said first alloy.

2. A multicellular converter core as defined in claim 1 wherein the central portion of said stack is compressed and the thin stainless steel metal strips are secured together in said central portion of said stack.

3. A multicellular converter as defined in claim 2 wherein said thin stainless steel metal strips are secured together by a fused metal.

4. A multicellular converter core as defined in claim 3 having a housing surrounding said S-wound stack, said housing having inner and outer surfaces, and wherein the distal extremities of said thin stainless steel metal strips are secured to the inner surface of said housing.

5. A multicellular converter core as defined in claim 4 wherein the distal extremities of said thin stainless steel metal strips are secured by a fused metal.

6. A multicellular converter core as defined in claim 1 wherein the first portion of the thin stainless steel metal strips includes all of the corrugated thin stainless steel metal strips and less than all of the flat thin stainless steel metal strips, the balance of the flat thin stainless steel metal strips being of said second alloy.

7. A multicellular converter core as defined in claim 1 wherein the first portion of the thin stainless steel metal strips includes all of the flat thin stainless steel metal strips and less than all of the corrugated thin stainless steel metal strips, the balance of the corrugated thin stainless steel metal strips being of said second alloy.

8. A multicellular converter core as defined in claim 1 wherein the thin stainless steel metal strips all have the same thickness.

9. A multicellular converter core as defined in claim 8 wherein the thickness of the thin stainless steel metal strips is in the range of from 0.0015" to 0.009".

10. A multicellular converter core as defined in claim 1 wherein the first alloy is a stainless steel iron alloy containing aluminum in an amount up to about 5% by weight.

11. A multicellular converter core as defined in claim 1 wherein the second alloy is a nickel/chromium alloy.

12. A multicellular converter core as defined in claim 1 wherein the second alloy is a nickel/chromium alloy free of aluminum.

13. A multicellular converter core as defined in claim 4 wherein the corrugated thin stainless steel metal strips are secured to the flat thin stainless steel metal strips at only the central portion of each, respectively.

14. A multicellular converter core as defined in claim 13 wherein the corrugated thin stainless steel metal strips and the flat thin stainless steel metal strips are secured at the distal extremities to the housing, and the central portion of the corrugated thin stainless steel metal strips and the flat thin stainless steel metal strips are free to undergo relative movement.

15. A multicellular converter core as defined in claim 1 wherein the corrugated thin stainless steel metal strips and the flat thin stainless steel metal strips have a coating of refractory metal oxide on at least one surface thereof.

16. A multicellular converter core as defined in claim 15 further comprising a noble metal catalyst supported on said refractory metal oxide surface.

17. A multicellular converter core as defined in claim 1 having a cell density in the range of from about 50 to about 800 cells per square inch.

18. A multicellular converter core as defined in claim 11 wherein said second portion has at least one thin stainless steel metal strip of said second alloy.

19. A multicellular converter core as defined in claim 12 wherein said second portion has at least one thin stainless steel metal strip of said second alloy.

20. A multicellular converter core as defined in claim 11 wherein said second portion has from 1 to 24 of said thin stainless steel metal strips of said second alloy.

21. A multicellular converter core as defined in claim 11 wherein said second portion has from 1 to 24 of said thin stainless steel metal strips of said second alloy.

22. A multicellular converter core comprising an S-wound stack of alternating corrugated thin stainless steel metal strips and flat thin stainless steel metal strips, each of said stainless steel metal strips having a central portion, an intermediate portion and distal extremities, said S-wound stack being contained in a surrounding housing, which housing has inner and outer surfaces, said thin stainless steel strips being secured together at the central portions thereof, and each of said thin stainless steel metal strips being secured at the respective distal extremities thereof to the inner surface of said housing, the intermediate portions being free to move relative to one another in response to changes in temperature, said core having a first portion of the thin stainless steel metal strips of a first alloy, and a second portion of the thin stainless steel metal strips of a second alloy, said second alloy having a yield strength greater than that of said first alloy.

23. A multicellular converter core as defined in claim 22 wherein the corrugated thin stainless steel metal strips and the flat thin stainless steel metal strips have a coating of refractory metal oxide on at least one surface thereof.

24. A multicellular converter core as defined in claim 23 further comprising a noble metal catalyst supported on said refractory metal oxide surface.

* * * * *